(12) United States Patent
Benson et al.

(10) Patent No.: US 12,539,173 B2
(45) Date of Patent: Feb. 3, 2026

(54) SYSTEM FOR TRIGGERING PATIENT ANALYTIC SERVICES FOR A MEDICAL PROVIDER

(71) Applicant: Medicrea International, Rillieux-la-Pape (FR)

(72) Inventors: Nicholas Benson, Collierville, TN (US); Adam Deitz, Austin, TX (US); Aleah Mollenkamp, Duncan, SC (US)

(73) Assignee: MEDICREA INTERNATIONAL (FR)

( * ) Notice: Subject to any disclaimer, the term of this patent is extended or adjusted under 35 U.S.C. 154(b) by 481 days.

(21) Appl. No.: 18/066,417

(22) Filed: Dec. 15, 2022

(65) Prior Publication Data

US 2024/0197400 A1    Jun. 20, 2024

(51) Int. Cl.
| | |
|---|---|
| A61B 34/10 | (2016.01) |
| G06T 1/00 | (2006.01) |
| G16H 10/60 | (2018.01) |
| G16H 30/20 | (2018.01) |

(52) U.S. Cl.
CPC ............ *A61B 34/10* (2016.02); *G06T 1/0021* (2013.01); *G16H 10/60* (2018.01); *G16H 30/20* (2018.01)

(58) Field of Classification Search
None
See application file for complete search history.

(56) References Cited

U.S. PATENT DOCUMENTS

| | | | |
|---|---|---|---|
| 7,353,179 B2 | 4/2008 | Ott et al. | |
| 11,308,147 B2 | 4/2022 | Becker et al. | |
| 2012/0035963 A1 | 2/2012 | Qian et al. | |
| 2016/0125135 A1 | 5/2016 | Ramanathan et al. | |
| 2016/0132645 A1* | 5/2016 | Charpentier | ........... G16H 10/60 705/3 |

(Continued)

FOREIGN PATENT DOCUMENTS

| | | | | |
|---|---|---|---|---|
| CN | 108415919 A | | 8/2018 | |
| EP | 3836155 A1 * | | 6/2021 | ............. G16H 30/20 |

(Continued)

OTHER PUBLICATIONS

Zhang et. al., Medical Image Key Area Protection Scheme Based on QRCode and Reversible Data Hiding, , Jul. 15, 2021, Hindawi Security and Communication Networks, vol. 2021, Article ID 5511806 (Year: 2021).*

(Continued)

*Primary Examiner* — Anne-Marie K Alderson
(74) *Attorney, Agent, or Firm* — FOX ROTHSCHILD LLP

(57) ABSTRACT

Disclosed herein are systems and methods for triggering patient analytic services for a medical provider. A system includes a memory and at least one processor coupled to the memory and configured to maintain one or more records associated with a subject. The processor is further configured to receive one or more medical images related to the subject from an image server and generate a computer-readable symbol that encodes a link for accessing the planning system. The link includes a planning-system identifier and a subject identifier. The processor is further configured to generate a planning image based on information associated with the subject, embed the generated computer-readable symbol in the planning image, and transmit the planning image to the image server.

16 Claims, 7 Drawing Sheets

(56) References Cited

U.S. PATENT DOCUMENTS

| | | | |
|---|---|---|---|
| 2017/0262584 A1 | 9/2017 | Gallix et al. | |
| 2018/0189447 A1* | 7/2018 | Khatri | G06K 7/1099 |
| 2018/0325605 A1* | 11/2018 | Scherr | A61B 34/25 |
| 2018/0330286 A1* | 11/2018 | Ramanathan | G16H 30/20 |
| 2019/0287671 A1* | 9/2019 | Mako | A61B 90/98 |
| 2019/0355483 A1* | 11/2019 | Smurro | A61B 34/30 |
| 2019/0371454 A1 | 12/2019 | Yu et al. | |
| 2020/0113524 A1* | 4/2020 | Benson | G16H 50/20 |
| 2022/0172818 A1* | 6/2022 | Fanson | A61B 90/96 |

FOREIGN PATENT DOCUMENTS

| | | | | |
|---|---|---|---|---|
| KR | 20220107642 A | 8/2022 | | |
| WO | WO-2022035941 A1 * | 2/2022 | | A61B 34/10 |

OTHER PUBLICATIONS

Seenivasagam et al., A QR Code Based Zero-Watermarking Scheme for Authentication of Medical Images in Teleradiology Cloud, Comput Math Methods Med. Jul. 18, 2013;2013:516465. (Year: 2013).*

Chang, Yi-Ying et al., A mobile medical QR-code authentication system and its automatic FICE image evaluation application https://www.elsevier.es/en-revista-journal-applied-research-technology-jart-81-articulo-a-mobile-medical-qr-code-authentication-S166564231500022X.

* cited by examiner

SYSTEM FOR TRIGGERING PATIENT ANALYTIC SERVICES FOR A MEDICAL PROVIDER

FIELD

The present technology is generally related to systems and methods for surgical planning.

BACKGROUND

A picture archiving and communication system (PACS) is a computerized means of replacing the roles of conventional radiological film. PACS are used by hospitals and other healthcare facilities to store and share the images created by various medical equipment, such as x-rays, MRIs, ultrasounds, and CT scans. Before PACS were widely used, medical images were physically stored, e.g., in film jackets and then filed in cabinets. Film might only be available in one place at a time and could result in delayed patient care if it was not immediately available to, e.g., a referring physician. With PACS, patient studies can be viewed over a secured network, e.g., at medical facilities or from a physician's office. PACS are now widely used for a wide variety of medical images, including preoperative images.

Preoperative planning systems include visualization, modeling, analysis, and plan generation. Visualization consists of showing the original images (e.g., from a PACS), structures of interest, implants and/or surgical tools in a way that is intuitive and useful for the clinician. Modeling consists of creating mathematical representations of the structures of interest, the surgical tasks and their constraints, and the physiological phenomena that are taken into account for the planning. Analysis consists of exploring the solution space of the planning problem by manual exploration, simulation, and/or optimization. Plan generation consists of selecting the solution that is most appropriate for the intervention based on the results of the visualization and the analysis.

However, widespread adoption of preoperative planning systems may be impeded when they do not interact seamlessly with PACS. For example, users may be required to separately authenticate with both systems. Furthermore, patient information may be organized differently in the different systems. This document describes methods and systems that are directed to addressing the problems described above, and/or other issues.

SUMMARY

The techniques of this disclosure generally relate to triggering patient analytic services for a medical provider.

In one aspect, the present disclosure provides a system including a memory and at least one processor coupled to the memory, the processor configured to maintain one or more records associated with a subject. The processor is further configured to receive one or more medical images related to the subject from an image server and generate a computer-readable symbol that encodes a link for accessing the planning system. The link includes a planning-system identifier and a subject identifier. The processor is further configured to generate a planning image based on information associated with the subject, embed the generated computer-readable symbol in the planning image, and transmit the planning image to the image server.

Implementations of the disclosure may include one or more of the following optional features. In some examples, the at least one processor is further configured to maintain one or more surgical plans associated with the subject and generate a separate computer-readable symbol for each of the one or more surgical plans, where the link of each generated computer-readable symbol also includes a procedure identifier for the associated surgical plan. The at least one processor may embed at least one generated computer-readable symbol in the planning image, such that each embedded symbol is configured to, when viewed by a camera of a mobile device, cause the mobile device to access the associated surgical plan using the link. In some examples, the at least one processor is further configured to receive information related to the subject from an electronic health record (EHR) system. The at least one processor may be further configured to maintain one or more records associated with a surgical plan for the subject based on the received information. The link may also include a procedure identifier for the associated surgical plan. In some examples, the at least one processor is further configured to detect when new information is available from the EHR system. The at least one processor may be further configured to update the one or more records associated with the subject based on the new information and transmit one or more notifications based on the updated records. The one or more notifications may include a link configured to access the one or more records. The image server may include a picture archiving and communication system (PACS). The computer-readable symbol may include an indicia of the planning system.

In another aspect, the disclosure provides a computer-readable symbol. The computer-readable symbol may include an encoded link for accessing a planning system. The link may include a planning-system identifier, a subject identifier, and a procedure identifier for a surgical plan associated with the subject. The computer-readable symbol may be configured to, when viewed by a camera of a mobile device, cause the mobile device to access the planning system using the encoded link, and to further access the surgical plan associated with the subject.

Implementations of the disclosure may include one or more of the following optional features. In some examples, the computer-readable symbol further includes an indicia of the planning system and/or the surgical plan. The encoded link may be a Uniform Resource Locator (URL) and the computer-readable symbol may be a QR code. The computer-readable symbol may be further configured to cause the planning system to update the surgical plan in response to the mobile device accessing the planning system using the encoded link.

In another aspect, the disclosure provides a method of providing preoperative planning. The method includes receiving one or more medical images from an image server, the one or more medical images associated with a subject. The method may also include processing the one or more medical images to determine that the subject exhibits a condition and maintaining one or more records associated with the subject and the condition. The method may also include generating a computer-readable symbol that encodes a link for accessing the one or more records. The method may include a planning-system identifier and a subject identifier. The method may also include generating one or more files including the generated computer-readable symbol.

Implementations of the disclosure may include one or more of the following optional features. In some examples, the method further includes transmitting the generated one or more files to the image server. In some examples, the method further includes maintaining records associated with one or more procedures for the condition of the subject. The computer-readable symbol may encode information further including a procedure identifier. In some examples, the method further includes generating a separate computer-readable symbol for each of the one or more procedures, wherein the link of each generated computer-readable symbol further includes the procedure identifier for the associated surgical plan. The method may also include embedding at least one generated computer-readable symbol in the one or more files, wherein each embedded symbol is configured to, when viewed by a camera of a mobile device, cause the mobile device to access the associated surgical plan using the link. In some examples, the method further includes receiving electronic health records associated with the subject and updating the one or more records based on the received electronic health records. In some examples, the method further includes detecting when new information is available from an EHR system. In response to the new information being available, the method may include updating the one or more records associated with the subject based on the new information and transmitting one or more notifications based on the updated records. The one or more notifications may include a link configured to access the one or more records. The computer-readable symbol may include an indicia of the planning system. The image server may include a picture archiving and communication system (PACS).

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
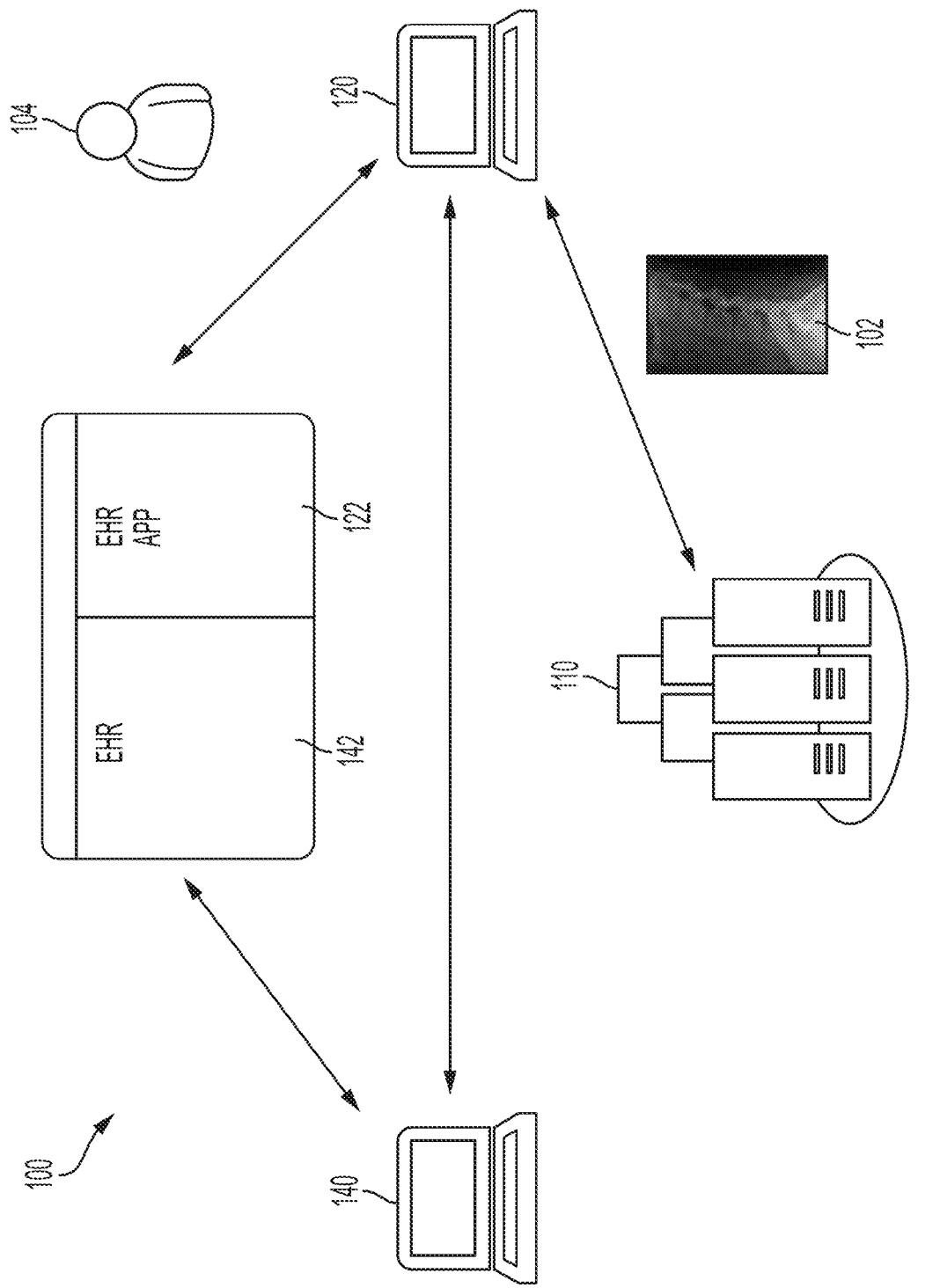
FIG. 1 shows an example environment for surgical planning.

This document describes system, apparatus, device, method and/or computer program product embodiments, and/or combinations and sub-combinations of any of the above, for gathering information for and/or triggering patient analytic services for a medical provider.

In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other and are not necessarily "superior" and "inferior". Generally, similar spatial references of different aspects or components indicate similar spatial orientation and/or positioning, i.e., that each "first end" is situated on or directed towards the same end of the device.

The following terms shall have, for purposes of this application, the respective meanings set forth below:

A "computing device," "electronic device," or "computer" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, mobile electronic devices such as smartphones, Internet-connected wearables, tablet computers, laptop computers, and appliances and other devices that can communicate in an Internet-of-things arrangement. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices will be discussed below in the context of FIG. 7.

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

The system(s) and method(s) described in this disclosure are generally directed to gathering information for and/or triggering patient analytic services for a medical provider, e.g., by seamlessly integrating planning systems with existing clinical workflow. FIG. 1 shows an example environment 100 for surgical planning, e.g., at a medical provider facility staffed by clinicians 104. The medical facility may be a hospital, an out-patient clinic, or other venue where medical assessment and/or treatment can be provided. The environment 100 may include one or more preoperative (or general medical) planning systems 120. The planning systems 120 may be similar in structure and/or include features that are similar to components of the pre-operative assessment system disclosed in U.S. patent application Ser. No. 17/474,139, which is incorporated herein by reference in its entirety. The preoperative planning systems 120 may maintain information related to a subject under assessment (e.g., for a reported condition) and may provide functionality that facilitates assessing the subject and/or treating the condition. In some examples, the preoperative planning system 120 is cloud-based and may be accessed (e.g., by the clinician 104) via a web browser or an app 122 (e.g., executing on a tablet or smart phone). In some examples, the preoperative planning system 120 is integrated with an Electronic Health Record (EHR) system 140 of the provider facility. The EHR system 140 may include a computer interface 142 (e.g., a web portal, accessible via a web browser) allowing clinicians 104 to access and view patient information. The EHR computer interface 142 may also allow for approved web applications or web pages to be displayed within the EHR computer interface (e.g., within an HTML iFrame), or for the web page/app to be launched from the EHR computer interface. In this way, the clinician 104 can readily transition from viewing patient information in the EHR system 140, to accessing the full range of subject-assessment functionality of the preoperative planning system 120. Furthermore, the preoperative planning system 120 and EHR system 140 may use a single sign-on (SSO) authentication scheme so that the users of the EHR system 140 may access the preoperative planning system 120 (e.g., via a web app) without having to provide a second set of credentials. The EHR system 140 may also provide a subject identifier to the preoperative planning system 120 (e.g., when the preoperative planning system app 122 is launched from the EHR computer interface 142). In this way, the preoperative planning system 120 may automatically access and/or display information related to the identified subject, allowing, e.g., a clinician 104 to more quickly access the relevant subject-assessment functionality of the preoperative planning system 120. If the preoperative planning system is unable to match the subject identifier to a record in its database, the preoperative planning system may automatically collect relevant medical and administrative electronic records on the subject and/or trigger patient analytic services for the subject.

The EHR system 140 may store a range of medical and administrative electronic records related to the subject, including demographics, medical history, medication and allergies, immunization status, laboratory test results, radiology images and reports, vital signs, personal statistics like age and weight, billing information, scheduling data, and so forth. The preoperative planning system 120 may exchange information with the EHR system 140, e.g. using the Fast Healthcare Interoperability Resources (FHIR) standard. In this way, the preoperative planning system 120 may obtain additional information related to the subject to further facilitate assessing the subject and/or treating the condition. In some examples, the preoperative planning system 120 may periodically query the EHR system 140 for updates on providers and patients and may incorporate the updates, as needed, in its assessment, planning, scheduling, etc. Furthermore, the preoperative planning system 120 may upload patient information to the EHR system 140, e.g., to reflect revised subject assessments, revised subject treatment plans, or any time new information is available for review or approval.

Figure 2:
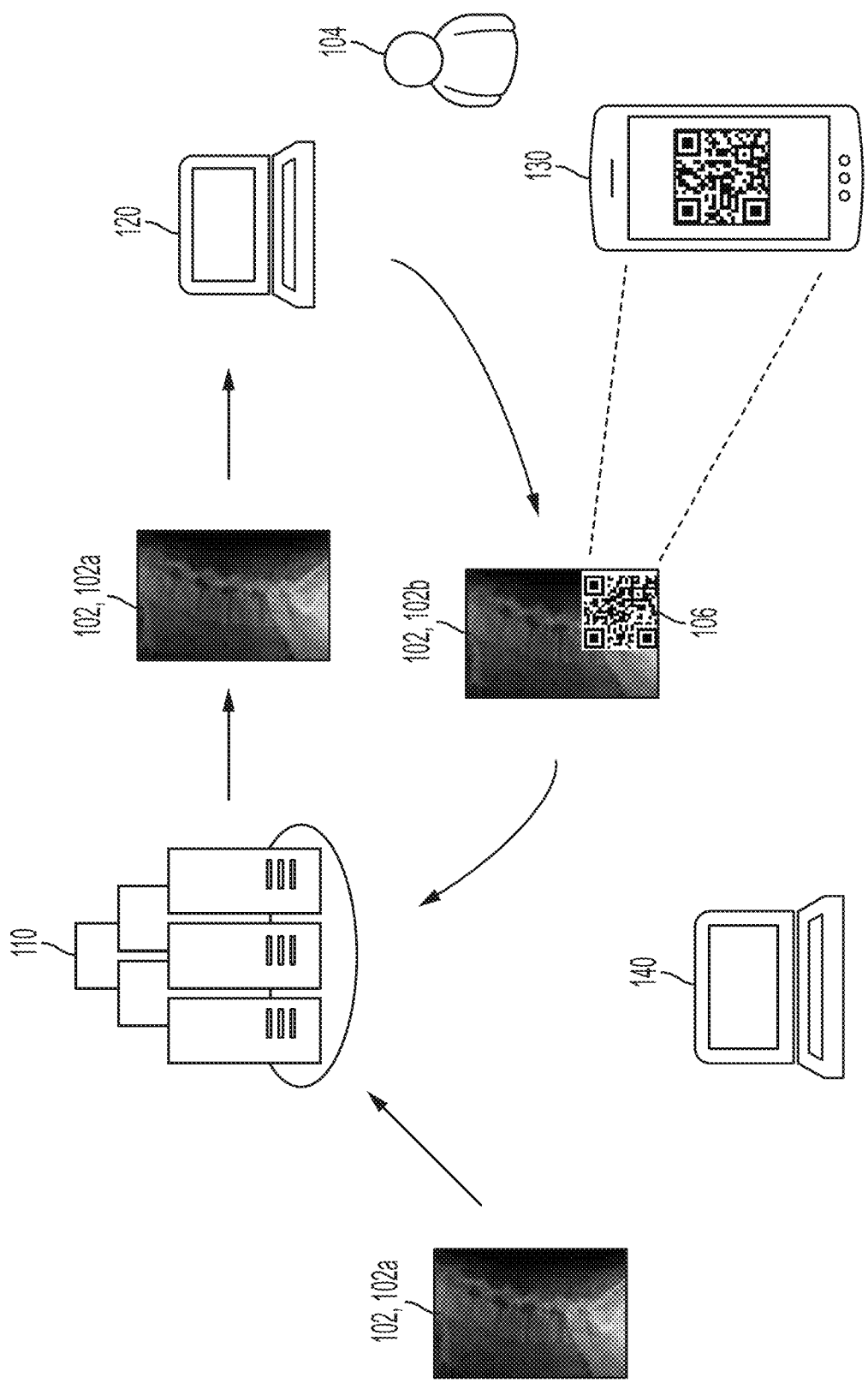
FIG. 2 shows an example workflow for surgical planning.

The environment 100 may also include an image server 110 or repository configured to receive, catalog, and retrieve medical images 102, e.g., from medical imaging devices (or other sources of images). For example, the image server 110 may be a Picture Archiving and Communication System (PACS) storing images from various medical devices, such as x-rays, MRIs, ultrasound recorders, CT scanners, etc. The image server 110 may receive, store, and/or transmit medical images according to Digital Imaging and Communications in Medicine (DICOM) protocols. Referring to FIG. 2, radiologists or other medical or non-medical professionals may upload the medical images (e.g., 102*a*) to the image server 110 for later retrieval and/or viewing. The image server 110 may limit access to authenticated users, e.g., via multi-factor authentication or other appropriate security techniques or systems. In some examples, medical facilities include viewing stations on the premises where authenticated users (e.g., clinician 104 or other facility staff) may view downloaded images.

The preoperative planning system 120 may be configured to authenticate (using appropriate security techniques or systems) with the image server 110, so that the preoperative planning system 120 may retrieve medical images (e.g., 102*a*) associated with the patient/subject from the image server 110. For example, the authentication process may be performed at the time the patient/subject case is first opened in the preoperative planning system 120. The authentication process may include generating a token or key that can be used for subsequent authentication with the image server 110. After the preoperative planning system 120 receives the medical images 102*a* associated with the patient/subject, the system may analyze the received medical images 102*a* (e.g., with additional input from a medical professional and/or additional information, data, images, etc. from other online sources, such as the EHR system 140) to produce an assessments, diagnoses, and/or plans for therapy, surgery, or other treatment of the subject/patient.

The preoperative planning system 120 may use the downloaded images for visualization, modeling, analysis, and/or plan-generation functions. For example, the preoperative planning system 120 may display a preoperative image 102*a* of a patient's injured or diseased spine. The preoperative planning system 120 may also allow a clinician 104 to model the results of one or more potential surgical (or non-surgical) interventions for a condition of the patient/subject. The preoperative planning system 120 may analyze the potential interventions, e.g., to determine a likelihood of success. The preoperative planning system 120 may recommend or select surgical tools and/or implants or the like to use for each potential procedure. Selecting implants may include generating specifications for bespoke, custom implants. In some cases, the preoperative planning systems 120 may check, e.g., an inventory database, for availability of tools and/or implants, and/or cause bespoke components to be ordered or to be manufactured according to a specification generated by the preoperative planning system 120. The preoperative planning system 120 may also generate images or labels to be applied to bespoke and/or custom manufactured components. The preoperative planning system 120 may further schedule surgical facilities, staff, and/or other resources required for selected procedures. The preoperative planning system 120 may also provide information to authorized stakeholders, such as primary-care physician, insurance providers, etc.

In some examples, the preoperative planning system 120 simultaneously maintains plans for each of multiple alternative surgical (and/or non-surgical) approaches, allowing the clinician 104 to compare potential approaches and to evaluate the relative advantages and disadvantages. For example, approaches to spinal surgery may include may include Anterior Lumbar Interbody Fusion (ALIF) surgery, Transforaminal Lumbar Interbody Fusion (TLIF) surgery, Posterior Lumbar Interbody Fusion (PLIF) surgery, Extreme Lateral Interbody Fusion (XLIF) surgery, and so forth. The preoperative planning system 120 may generate additional images or reports related to potential interventions. For example, the preoperative planning system 120 may generate images of the predicted post-intervention states of the patient's spine, e.g., for comparison with post-intervention medical images. The preoperative planning systems 120 may also perform image processing (e.g., contrast enhancing) on the downloaded images 102 or produce three-dimensional images and/or time-series images from a set of two-dimensional images. The preoperative planning system 120 may also annotate images (either original images or any or all of the generated images/reports) to indicate and/or highlight aspects or features related to potential interventions, or to include instructions and/or other notations provided by the clinician 104. For example, the preoperative planning systems 120 may include annotations related to dimensions/shapes of (or between) anatomical structures, such as bones, etc. The preoperative planning system 120 may upload such generated images 102*b* to the image server 110 and associate these new images with the patient/subject, e.g., for later download and review. In this way, future users of the image server 110 will be able to access the processed/generated images as well as the original images via the familiar interface to the image server 110. When connected with an EHR system, the pre-operative planning system may also automatically send notifications to medical and/or non-medical professionals associated to the subject to communicate that processed/generated images and/or associated analytic services have been completed and are available for review. These notifications will appear in the EHR system and also may contain a link to launch the preoperative planning system and automatically direct the user to the correct subject record and/or analytic service data.

However, these generated/enhanced images may not convey all the subtleties of each potential intervention. Furthermore, as the clinician 104 reviews the images 102 (and/or newly acquired images 102), the clinician 104 may want to further refine some or all of the potential interventions, and/or revisit potential interventions (or pursue additional interventions). In each of these cases, and others, the clinician 104 may need to reengage with the (interactive) preoperative planning system 120, rather than merely viewing static medical images 102—even if the images 102 are well annotated. However, reengaging with the preoperative planning system 120 may require launching an application or navigating to a web page, authenticating with the app/webpage, navigating to the patient's particular case/records, retrieving the new or updated medical images from the server 110, etc. Each of these steps takes some time/effort and each of these steps presents an opportunity for error and associated user frustration. Unlike the EHR system 140 described above, a medical image viewing system or workstation may not include a sophisticated computer interface. In particular, the medical image viewing system may lack the ability to display or launch an app or other computer interface to the preoperative planning system 120. That is, the image viewing system or workstation functionality may be largely limited to presented stored images for visual review. The clinician may have mobile electronic device, such as a tablet or smart phone, which is capable of accessing the preoperative planning system 120, but the mobile device 130 may be prohibited from or otherwise unable to access the image server 110. Likewise, the image server 110 may be unable to directly communicate with the mobile device 130.

To address this issue, the preoperative planning system 120 may configure and upload images to the image server 110, such that when the uploaded images are displayed (e.g., on an image viewing system or workstation within a facility), the images present encoded information that can be interpreted or understood by a mobile device 130. In particular, the encoded information may be understandable to a native image-processing/image-recognition capability of the mobile device 130 as a link to, e.g., a web page or app. In this way, the clinician 104 may capture the displayed image (e.g., using a camera of the mobile device 130), causing the mobile device 130 to decode the encoded information and (using the decoded information) access the preoperative planning system 120 (e.g., by a web browser or app installed on the mobile device 130).

For example, the preoperative planning system 120 may encode information in a symbol 106 comprising computer-readable information, such as a simple, linear barcode, a two-dimensional (e.g., matrix) barcode (such as a quick-response (QR) code), or other widely recognizable computer-readable symbol format. The preoperative planning system 120 may overlay or otherwise apply the computer-readable symbol 106 to one or more images (e.g., 102*b*) before uploading the image(s) 102*b* to the image server 110. The uploaded image 102*b* may, e.g., be an enhanced version of a previously downloaded image (e.g., 102*a*), or may be an entirely new image produced by the preoperative planning system 120. The uploaded image 102*b* may simply be a copy of an image (e.g., 102*a*) that the preoperative planning system 120 had previously downloaded from the image server 110, but, e.g., as in the example above, with a QR code overlain. In other examples, the uploaded image 102*b* may be produced by the preoperative planning system 120, e.g., as a result of an analysis or study, or other processing by the preoperative planning system 120. For example, the uploaded image 102*b* may generated to indicate an estimated post-operative state of the subject, or intra-operative position of surgical tools. Or the uploaded image 102*b* may be a summary report of the planned medical procedure, e.g., describing the scope of the procedure, the estimated time to complete, the necessary surgical tools, medical implants, required staff, administrative information, and/or other pertinent information. Other generated (and uploaded) images 102*b* are also within the scope of this disclosure. The preoperative planning system 120 may overlay/apply/embed the computer-readable symbol 106 in the image(s) at known positions, such as the lower right corner of the image. Thus, the presence of the computer-readable symbol 106 on an image indicates that patient/subject case has already been opened in the preoperative planning system 120. The presence of the computer-readable symbol 106 on a generated image may further indicate that preoperative planning system 120 has performed an analysis, assessment, study, or the like.

Commonly used formats for computer-readable symbols 106 may encode thousands of alphanumeric characters in a pattern of black and white areas, which is more than sufficient to encode the name of an app, a web page address, or other information indicating how to access the preoperative planning system 120. The computer-readable symbol 106 may also encode information related to subject's case within the preoperative planning system 120. The computer-readable symbol 106 may also include a logo or other indicia of the preoperative planning system 120 (e.g., as a background) providing an additional visual indication that the computer-readable symbol 106 refers to the preoperative planning system 120 (and an open case within the preoperative planning system 120). Thus, when the clinician 104 views the annotated images 102*b*, e.g., through a standard PACS interface such as a viewing station, the clinician 104 may use the camera of a mobile device 130 to capture an image of the symbol 106. Using a QR-code reader native to the mobile device 130 the mobile device 130 may read the encoded information of the symbol 106, translate the information into alphanumeric characters, and (using the alphanumeric characters) access the corresponding patient case/records in the preoperative planning system 120. As described above, the encoded alphanumeric characters may be formatted as a Uniform Resource Locator (URL) that a web browser or app can use to access the planning system 120 and/or the corresponding patient case/records. The mobile device 130 may interpret the URL in response to detecting the computer-readable symbol 106, and may prompt the user whether or not to use the URL to access the planning system 120.

Figure 3:
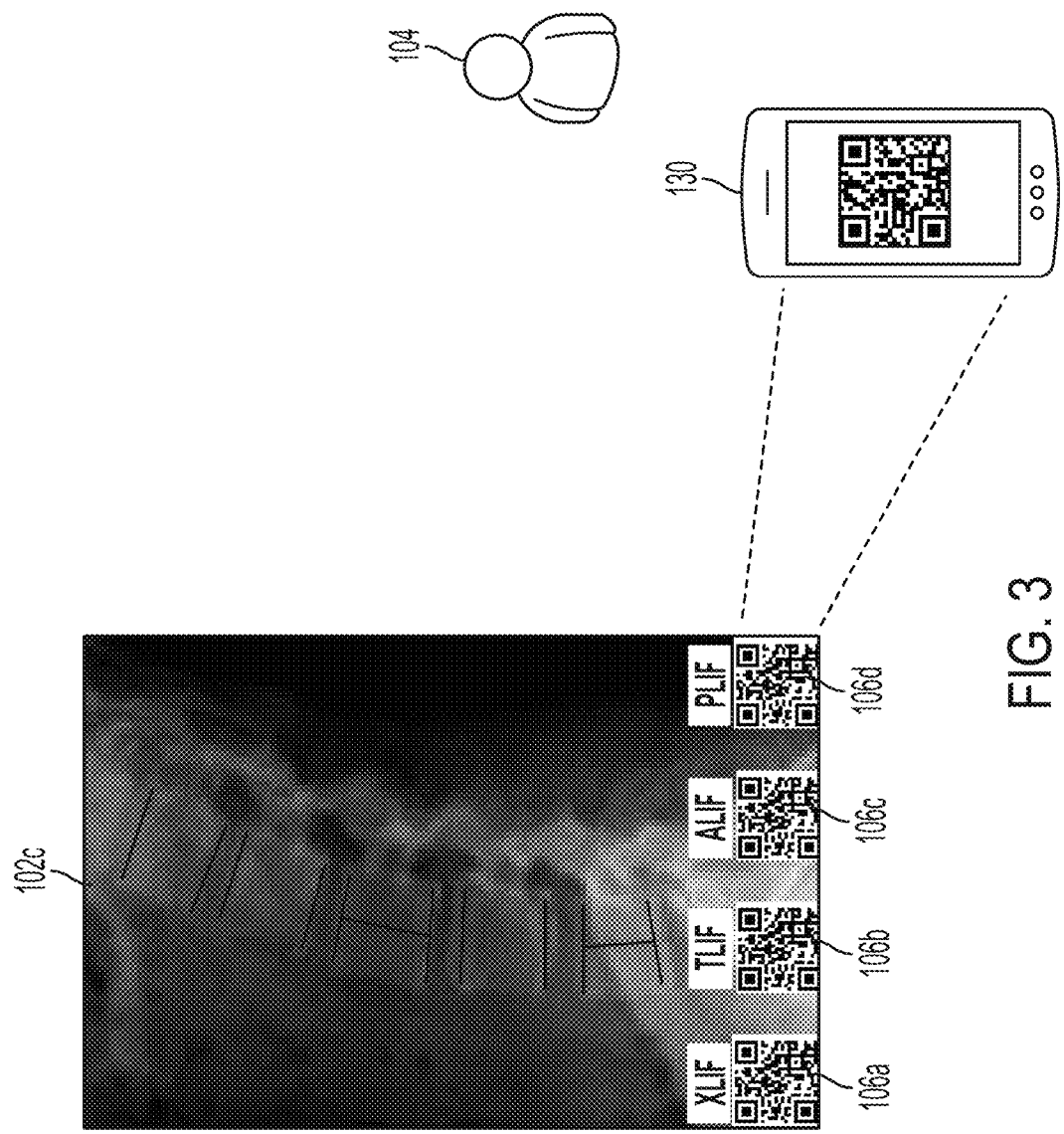
FIG. 3 shows an example image having multiple computer-readable symbols.

The preoperative planning system 120 may apply several computer-readable symbols 106 to one or more images (e.g., 102c, FIG. 3) before uploading the image 102c to the server 110. For example, the preoperative planning system 120 may generate separate computer-readable symbols 106 for each potential surgical procedure (e.g., encoding additional information specific to particular procedures). These separate computer-readable symbols (e.g., 106a-d) may be individually labeled to indicate their corresponding surgical procedure. For example, as described above, the preoperative planning system 120 may simultaneously maintain plans for each of ALIF, TLIF, PLIF, and XLIF procedures. In this case, the preoperative planning system 120 may generate four QR codes 106, one QR code 106 for each optional procedure, each QR code (e.g., 106a-d) encoding sufficient additional information to allow the clinician 104 to access the specific surgical procedure for the patient using the encoded information of the symbol 106. In some examples, the additional information causes the app (or web page) of the preoperative planning system 120 to automatically access information related to the particular procedure identified in the QR code 106.

Figure 4A:
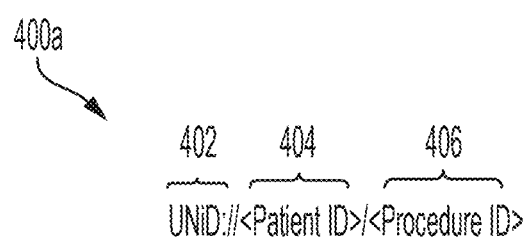
FIGS. 4A-4B illustrate example encoding schemes for a computer-readable symbol.
Figure 4B:

FIG. 4A illustrates an example format 400a for the information encoded in a computer-readable symbol 106. In this example, the information is formatted in the widely-used Uniform Resource Identifier (URI) format. The example format 400a includes a scheme field 402 which identifies the preoperative planning system 120. The scheme field 402 indicates (e.g., to the operating system of the mobile device 130) how to retrieve a resource. In this case, the alphanumeric string "UNiD" identifies a particular preoperative planning system 120. The mobile device 130 may be configured to launch an app or web page that provides access to the preoperative planning system 120 and to provide the remainder of the encoded information to the preoperative planning system 120 (e.g., after the clinician 104 provides credentials, such as a password/passphrase or biometric equivalent such as fingerprint to authenticate the clinician 104 to the preoperative planning system 120). The remainder of the information may include a patient identifier 404 and (optionally) a procedure identifier 406. The patient identifier 404 (and the optional procedure identifier 406) may be in the form of pseudo-random numbers or cryptographic hashes, or other formats that protect the identity of the patient. After the mobile device 130 launches the app/webpage that accesses the preoperative planning system 120 (and provides the patient identifier 404 and optional procedure identifier 406 to the preoperative planning system 120), the preoperative planning system 120 may use the provided information to locate/access the associated patient records. Referring to FIG. 4B, another example format 400b is illustrated. In this example, the information is formatted in the widely-used Uniform Resource Locator (URL) format and refers to a web server which provides an online interface to the preoperative planning system 120. Because a generic web browser (installed on the mobile device 130) may access the web site, this approach obviates the need for installing an app on the mobile device 130. Other formats 400 are also within the scope of this disclosure.

The preoperative planning system 120 may be further configured to automatically download any new patient medical images from the image server 110 (and/or the EHR system 140) whenever the preoperative planning system 120 is accessed, including when the preoperative planning system 120 is accessed by a mobile device 130 of a clinician 104 in response to decoding a symbol 106 in an image 102. In some examples, the preoperative planning system 120 is configured to automatically perform other steps when new images 102 are obtained from the image server 110 (and/or when new information is available from the HR server). These other steps may include notifying providers and/or clinicians 104 of newly available images, performing additional studies or analyses based on the images (or notifying technicians or clinicians 104 to perform the studies/analyses), uploading new information to the EHR system 140, etc. Notification may be sent by e-mail, text, via an app, via an EHR connection, or other suitable means. The notification may include a link (e.g., in plain text or an image, such as a logo) that, when selected, causes an electronic device to access the preoperative planning system 120.

Thus, embedding the embedded computer-readable symbol 106 within an image/report removes several impediments to clinician 104 reengagement, and may be used to automatically trigger analysis/assessment of a subject. The clinician 104 merely captures an image of the computer-readable symbol 106 (which the clinician 104 may view on a familiar and readily accessible display screen of the image server 110). If the clinician 104 has not already authenticated with the preoperative planning system 120, the clinician 104 then provides a pass phrase or biometric information (e.g., fingerprint, facial image), to access the particular patient's case records (and optionally a particular surgical approach) to gain access to the full complement of features of the preoperative planning system 120. Furthermore, the preoperative planning system 120 may obtain and apply extrinsic information, such as the current date and time, to supplement the provided information. For example, the preoperative planning system 120 may default to an intra-operative mode when launched during (or near) the patient's scheduled procedure date/time. Similarly, planning system 120 may default to a post-operative mode if launched (much) later than the scheduled procedure date/time. Other extrinsic information may include admission test information or other recent patient medical updates (e.g., from the EHR system 140).

Figure 5:
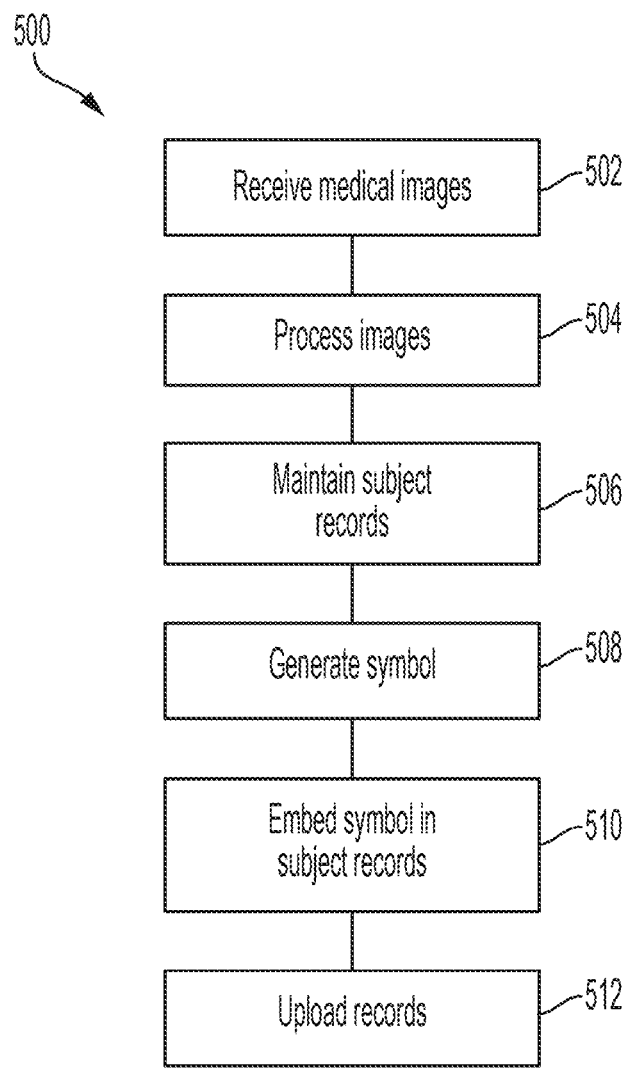
FIG. 5 is a flowchart of a method for providing preoperative planning.

FIG. 5 is a flowchart 500 of a method for providing preoperative planning. The method may be performed, e.g., by a preoperative planning system or other medical planning system 120. At step 502, the method includes receiving one or more medical images from an image server 110. As described above, the image server 110 may be a PACS or other source of medical images, such as x-ray images, CT scans, MRI images, etc. At step 504, the method includes processing the received images. For example, the medical planning system 120 may process the images to detect an injury, disease, condition, or other pathology of the subject exhibited in the images. In some examples, the medical planning system 120 is interactive. The medical planning system 120 may allow a user (e.g., clinician 104 or other medical professional) to interact with the images or data to help detect or assess the condition/pathology and/or help guide planning a treatment for the condition. As part of this process, the medical planning system 120 may (e.g., at step 506) maintain records associated with the subject. The records may include the images received at step 502, as well as records generated during assessment and planning stages. For example, the medical planning system 120 may generate images showing a predicted post-operative state of the anatomy of the subject. In some examples, the medical planning system 120 generates the post-operative images in response to input from the user, e.g., selecting particular treatment methods, using particular medical implants, etc. The medical planning system 120 may store and maintain these images and other subject-related records and as planning and subsequent treatment proceeds. These records may be accessible to authorized users, including clinicians 104 or others involved with the assessment and treatment of the subject.

To facilitate accessing the records, the medical planning system 120 may encode a link to the subject's files in the medical planning system 120. For example, the link may be a URL that includes sufficient information to identify the planning system 120 and the subject and/or the records associated with the subject. At step 508, the method includes generating a computer-readable symbol 106 that encodes the link. For example, the medical planning system 120 may generate a QR code that represents the encoded link. The QR code may be configured to cause a typical mobile device 130 to launch a web page or an app that accesses the planning system and the subject's records based on the information encoded in the link. At step 510, the method includes embedding the generated symbol in one or more subject records. For example, the medical planning system 120 may overlay, embed, or otherwise add the QR code to a portion of each image file of the subject's records maintained by the medical planning system 120. The medical planning system 120 may overlay, embed, or otherwise add the QR code to generated reports, regardless of whether the generated reports include images. For example, medical planning system 120 may overlay the generated QR code at a predetermined position (e.g., upper right corner) of every generated patient record. In some examples, the generated QR code also includes a logo or other indicia of the medical planning system 120, to inform users (e.g. those viewing the records) that the QR code is related to the medical planning system 120.

At step 512, the method includes uploading generated records (e.g., images), including the embedded computer-readable symbol 106, to the image server 110. Subsequently, as users view the uploaded records, the user may access the computer-readable symbol 106 will be visible. A label, logo, or other indicia of the medical planning system 120 may indicate to the user that the computer-readable symbol 106 may be used to access the subject's records in the medical planning system 120. Users may capture an image of the symbol using a mobile device 130, and, using the native capability of a typical mobile device 130, launch the app or web page encoded within the symbol. In some embodiments, the medical planning system 120 monitors the image server 110 (e.g., PACS or other source of medical images) to detect when new images are available and automatically performs the steps of the flowchart without human intervention. E.g., the medical planning system 120 may automatically retrieve the images, generate the computer-readable symbol 106, embed the computer-readable symbol 106 in the image, and upload the image to the image server 110. In some examples, the medical planning system 120 may have associated staff who perform one or more steps of the flowchart 500, e.g. either in collaboration with medical professionals, or even without input from clinicians 104 or other medical professionals. For example, staff associated with the medical planning system 120 may perform one or more steps that do not require the training of expertise of a medical professional (e.g., clinician 104) so that the medical planning system 120 is more efficient to use.

Figure 6:
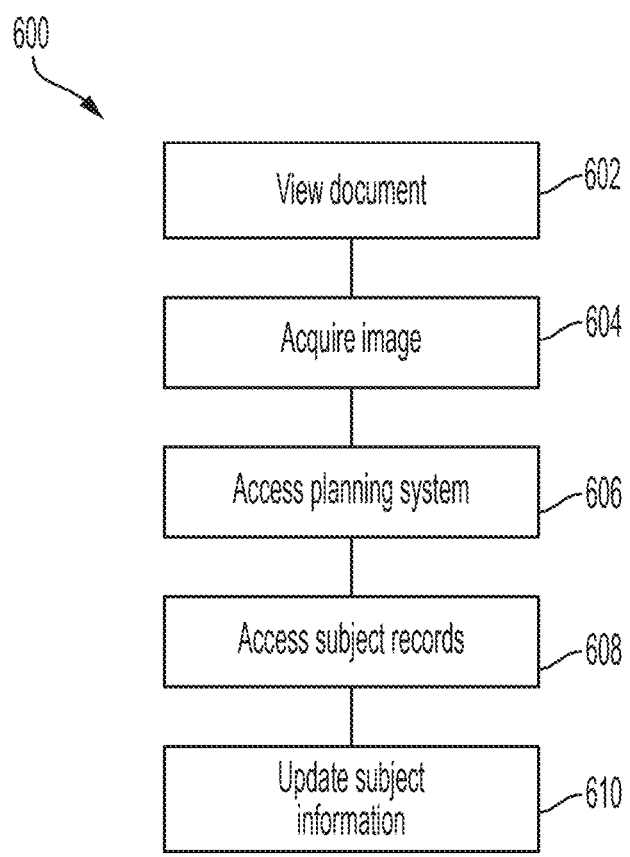
FIG. 6 is a flowchart of a method for providing preoperative planning.

FIG. 6 is a flowchart 600 of a method for providing preoperative planning. The method may be performed by a clinician 104 or other user. At step 602, the user views a document (e.g., an image from an image server). For example, the user may be a clinician 104 or other medical professional accessing images from a PACS related to a subject. As described above, the images may include records generated by a medical planning system 120 and may include one or more computer-readable symbols 106. In some examples, the computer-readable symbols 106 include indicia of the medical planning system 120 (and/or a specific treatments or conditions). At step 604, the method includes acquiring an image of one of the computer-readable symbols 106. For example, the user may use the camera of a mobile device 130 and, by adjust the field of view of the camera until it includes the computer-readable symbol 106 of interest to the user. The mobile device 130, may, in response to acquiring an image of one of the computer-readable symbol 106, and using its native image-processing capability, decode the symbol to obtain the link, and prompt the user whether to follow the link. At step 606, the method includes accessing the medical planning system 120 via the link (e.g., approving the prompt to follow the link). In some examples, the link includes a URL of a web page of the medical planning system 120 which allows authorized users to access the subject's records (e.g., after appropriate authentication). At step 608, the method includes accessing the subject's records. After authentication, authorized users may be able to access the complete capabilities of the medical planning system 120. That is, the users may further refine the subject's assessment and/or treatment plan, add new information, upload additional files (e.g., transfer files from the EHR system 140 using the FHIR protocol, or otherwise update subject information (e.g., step 610). In this way, the user may access the full capabilities of the medical planning system 120 through the computer-readable symbols 106 embedded in images related to the subject and viewable from the image server 110.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable gage/logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Figure 7:
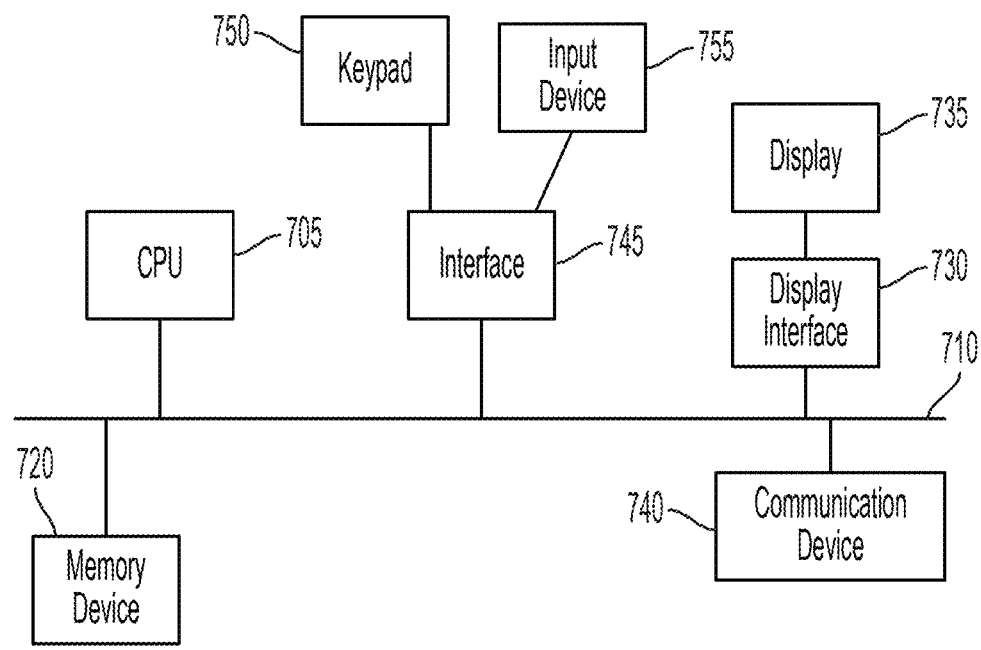
FIG. 7 shows a block diagram of an example of internal hardware that may be used to contain or implement program instructions according to an embodiment.

FIG. 7 illustrates example hardware that may be used to contain or implement program instructions. A bus 710 serves as the main information highway interconnecting the other illustrated components of the hardware. Central Processing Unit (CPU) 705 is the central processing unit of the system, performing calculations and logic operations required to execute a program. CPU 705, alone or in conjunction with one or more of the other elements disclosed in FIG. 7, is an example of a processor as such term is used within this disclosure. Read only memory (ROM) and random-access memory (RAM) constitute examples of non-transitory computer-readable storage media 720, memory devices or data stores as such terms are used within this disclosure.

Program instructions, software or interactive modules for providing the interface and performing any querying or analysis associated with one or more data sets may be stored in the memory device 720. Optionally, the program instructions may be stored on a tangible, non-transitory computer-readable medium such as a compact disk, a digital disk, flash memory, a memory card, a universal serial bus (USB) drive, an optical disc storage medium and/or other recording medium.

An optional display interface 730 may permit information from the bus 710 to be displayed on the display 735 in audio, visual, graphic or alphanumeric format. Communication with external devices may occur using various communication ports 740. A communication port 740 may be attached to a communications network, such as the Internet or an intranet.

The hardware may also include an interface 745 which allows for receipt of data from input devices such as a keypad 750 or other input device 755 such as a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also, that various presently unforeseen or unanticipated alternatives, modifications, variations or improvements therein may be subsequently made by those skilled in the art which are also intended to be encompassed by the following claims.

What is claimed is:

1. A planning system, comprising:
a memory; and
at least one processor coupled to the memory and configured to:
maintain one or more records associated with a subject;
receive one or more medical images from an image server, the one or more medical images related to the subject;
maintain one or more surgical plans associated with the subject;
generate a separate computer-readable symbol for each of the one or more surgical plans, each computer-readable symbol encoding a link for accessing the planning system, each link comprising:
a planning-system identifier;
a subject identifier; and
a procedure identifier for one of the surgical plans associated with the subject;
generate a planning image based on information associated with the subject;
embed each generated computer-readable symbol in the planning image, wherein each embedded symbol is configured to, when viewed by a camera of a mobile device, cause the mobile device to access the associated surgical plan using the link;
transmit the planning image to the image server for viewing;
receive, from the mobile device, a request to access the one or more surgical plans associated with the subject, the request comprising the subject identifier and the procedure identifier decoded from one of the computer-readable symbols in the planning image;
in response to receiving the request, access the surgical plan associated with the received procedure identifier and the subject identifier; and
provide the accessed surgical plan to the mobile device.

2. The planning system of claim 1, wherein:
the at least one processor is further configured to receive information related to the subject from an electronic health record (EHR) system; and
the at least one processor is further configured to maintain one or more records associated with a surgical plan for the subject based on the received information.

3. The planning system of claim 2, wherein the at least one processor is further configured to:
detect when new information is available from the EHR system;
update the one or more records associated with the subject based on the new information; and
transmit one or more notifications based on the updated records.

4. The planning system of claim 3, wherein the one or more notifications comprise a link configured to access the one or more records or trigger analytic services.

5. The planning system of claim 1, wherein the image server comprises a picture archiving and communication system (PACS).

6. The planning system of claim 1, wherein each computer-readable symbol comprises an indicia identifying the planning system.

7. The planning system of claim 1, wherein the one or more surgical plans associated with the subject comprise two or more surgical plans associated with the subject.

8. The planning system of claim 1, wherein the request to access the one or more surgical plans associated with the subject comprises an authentication token or key.

9. A method of providing preoperative planning comprising, by a planning system:
receiving one or more medical images from an image server, the one or more medical images associated with a subject;
processing the one or more medical images to determine that the subject exhibits a condition;
maintaining one or more records associated with the subject and the condition;
maintaining one or more surgical plans associated with the subject and the condition;
generating a separate computer-readable symbol for each of the one or more surgical plans, each computer-readable symbol encoding a link for accessing the one or more records, each link comprising:
a planning-system identifier;
a subject identifier; and
a procedure identifier for one of the surgical plans associated with the subject;
generating one or more files including each of the generated computer-readable symbols, wherein each embedded symbol is configured to, when viewed by a camera of a mobile device, cause the mobile device to access the associated surgical plan using the link; and transmitting the generated one or more files to the image server for viewing;

receiving, from the mobile device, a request to access the one or more surgical plans associated with the subject, the request comprising the subject identifier and the procedure identifier decoded from one of the computer-readable symbols in the planning image;

in response to receiving the request, accessing the surgical plan associated with the received procedure identifier and the subject identifier; and providing the accessed surgical plan to the mobile device.

10. The method of claim 9, further comprising:

receiving electronic health records associated with the subject; and updating the one or more records based on the received electronic health records.

11. The method of claim 10, further comprising:

detecting when new information is available from an EHR system; and in response to the new information being available:

updating the one or more records associated with the subject based on the new information; and transmitting one or more notifications based on the updated records.

12. The method of claim 11, wherein the one or more notifications comprise a link configured to access the one or more records.

13. The method of claim 9, wherein the computer-readable symbol comprises an indicia identifying the planning system.

14. The method of claim 9, wherein the image server comprises a picture archiving and communication system (PACS).

15. The method of claim 9, wherein maintaining one or more surgical plans associated with the subject comprises maintaining two or more surgical plans associated with the subject.

16. The method of claim 9, wherein receiving the request to access the one or more surgical plans comprises receiving an authentication token or key.

* * * * *